United States Patent [19]

Shimizu et al.

[11] Patent Number: 5,138,160

[45] Date of Patent: Aug. 11, 1992

[54] STORAGE TYPE PHOSPHOR SHEET HOLDING DEVICE

[75] Inventors: Kunimasa Shimizu; Makoto Ohgoda; Kazuo Daigo, all of Tokyo, Japan

[73] Assignee: Fuji Photo Film Co., Ltd., Kanagawa, Japan

[21] Appl. No.: 679,460

[22] Filed: Apr. 2, 1991

[30] Foreign Application Priority Data

Apr. 3, 1990 [JP] Japan .................................. 2-88735

[51] Int. Cl.⁵ .............................................. G01N 23/04
[52] U.S. Cl. .................................. 250/327.2; 378/182
[58] Field of Search ........................ 200/327.2, 484.1; 378/172, 173, 174, 182; 355/72; 354/276, 277, 281; 206/455

[56] References Cited

U.S. PATENT DOCUMENTS

| | | | |
|---|---|---|---|
| 4,258,264 | 3/1981 | Kotera et al. | 250/327.2 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,771,174 | 9/1988 | Torii | 250/327.2 |
| 4,777,365 | 10/1988 | Torii et al. | 250/327.2 |
| 4,885,468 | 12/1989 | Shimura | 378/198 |
| 4,889,989 | 12/1989 | Yoshimura et al. | 378/182 |
| 5,008,694 | 4/1991 | Tajima et al. | 378/182 |

FOREIGN PATENT DOCUMENTS 55-12429  1/1980  Japan .
56-11395  2/1981  Japan .

Primary Examiner—Carolyn E. Fields
Assistant Examiner—Drew A. Dunn
Attorney, Agent, or Firm—Sughrue, Mion, Zinn, Macpeak & Seas

[57] ABSTRACT

A storage type stimulable phosphor sheet holding device attached to an exposure apparatus, which has a cassette charging unit which is to be charged with the cassette, two pairs of cover opening mechanisms provided below the storage type phosphor sheet holding device and used to open the cover member of the cassette, a sheet holding unit for accommodating and holding therein an already-exposed storage type phosphor sheet taken out of the cassette, a sheet shifting mechanism for shifting the storage type phosphor sheet S to the sheet holding unit.

9 Claims, 8 Drawing Sheets

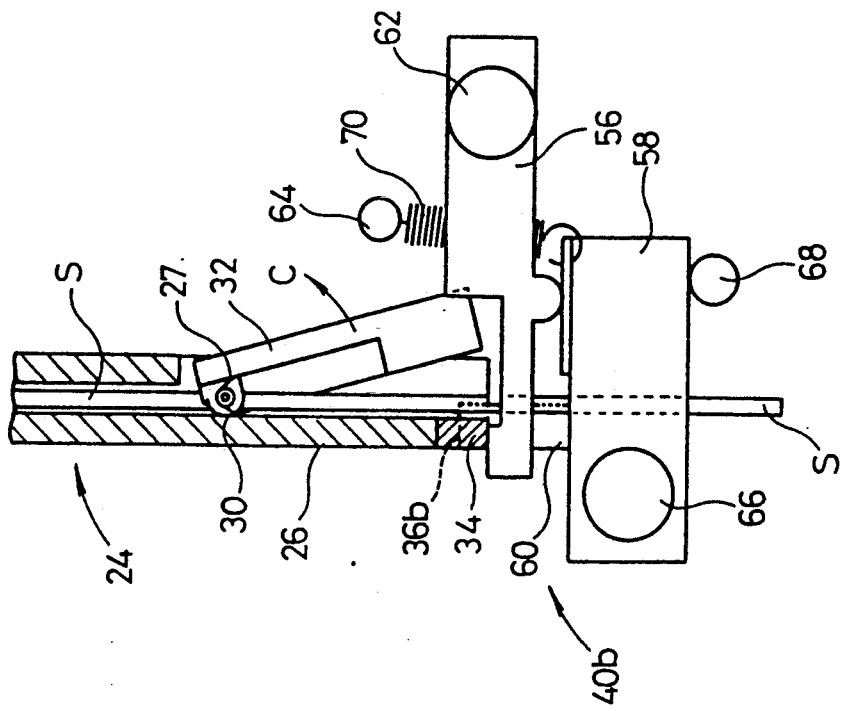
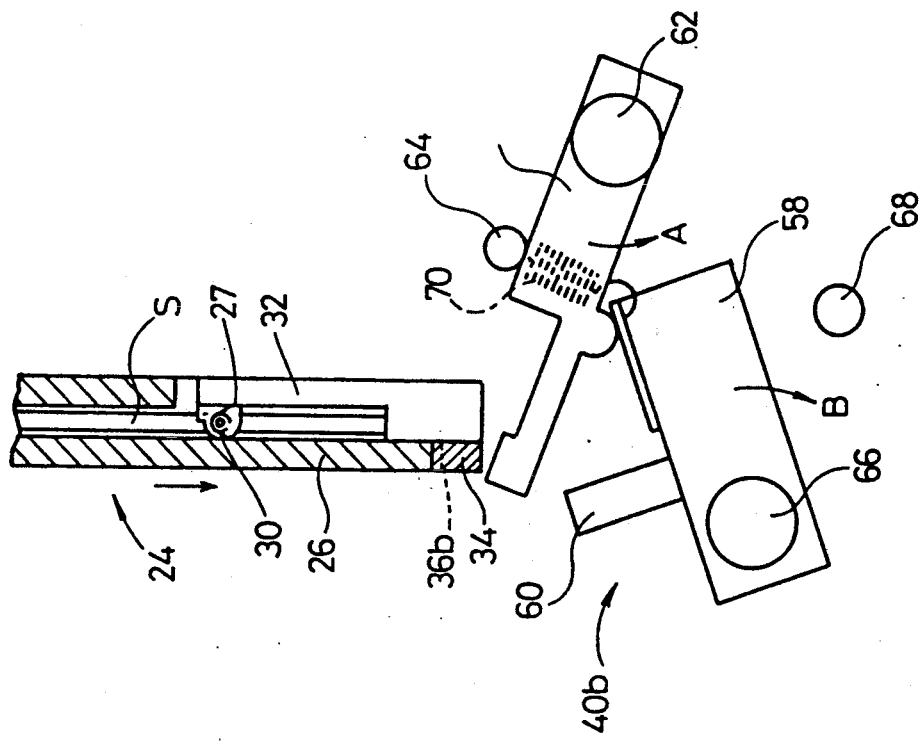

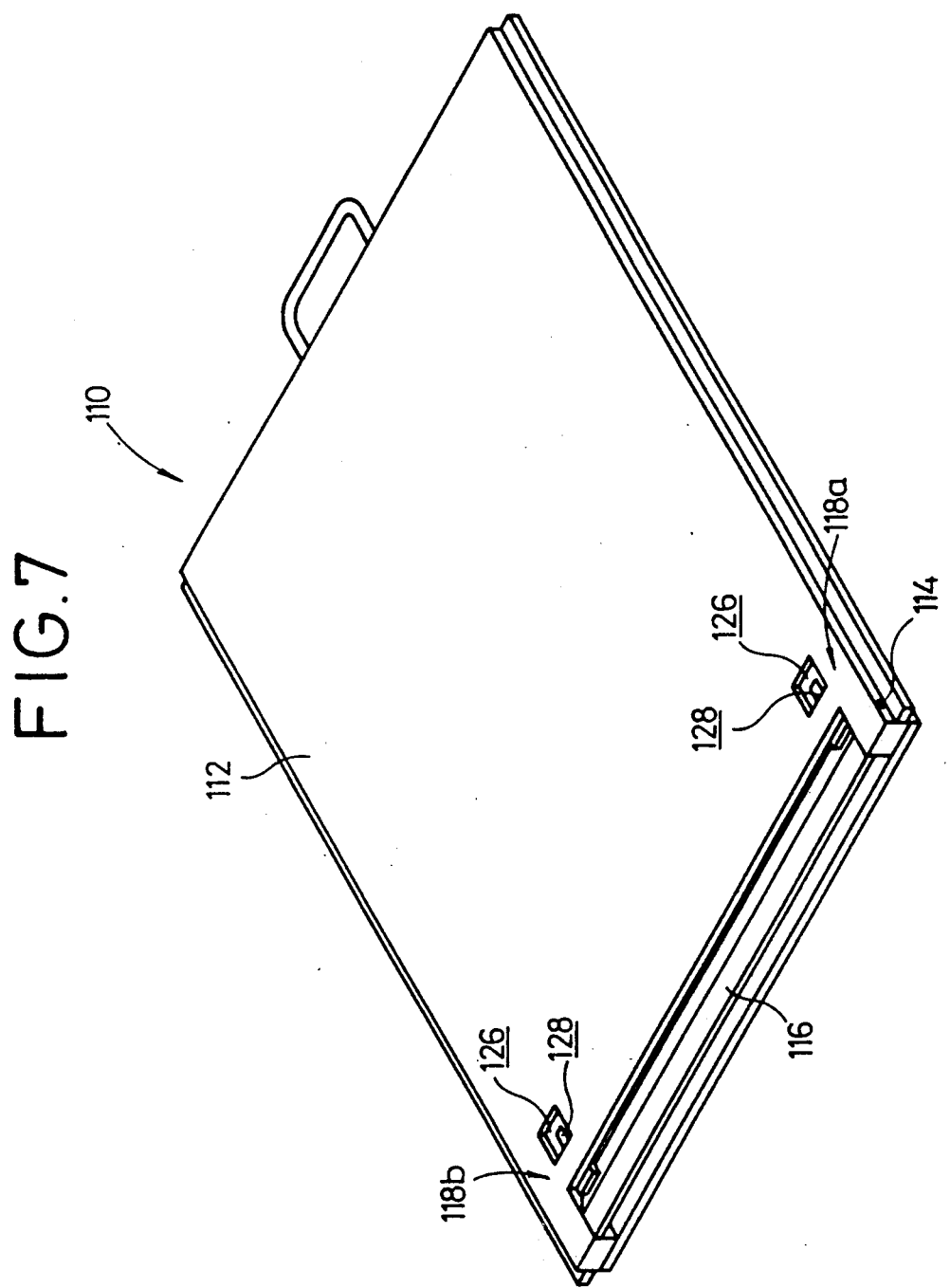

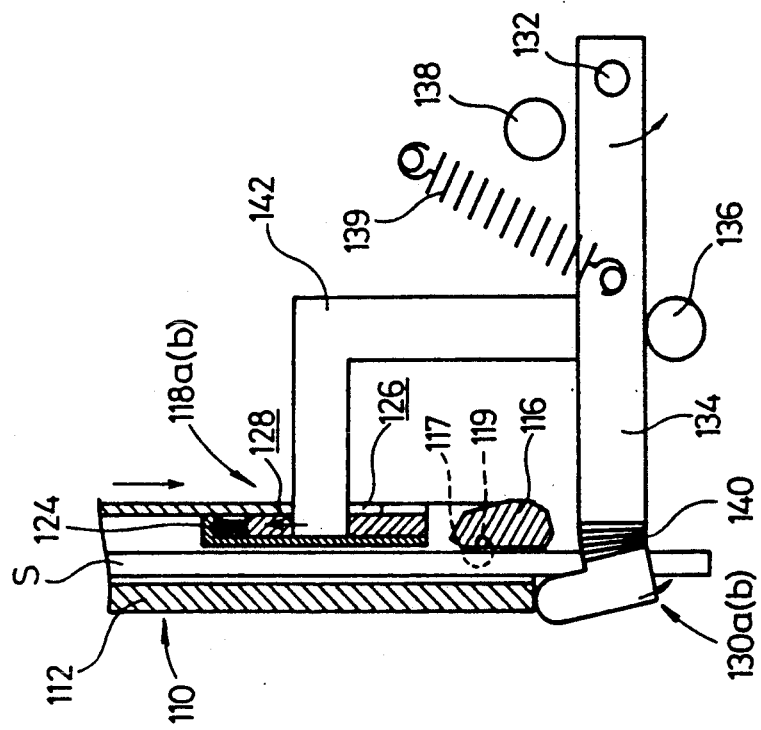
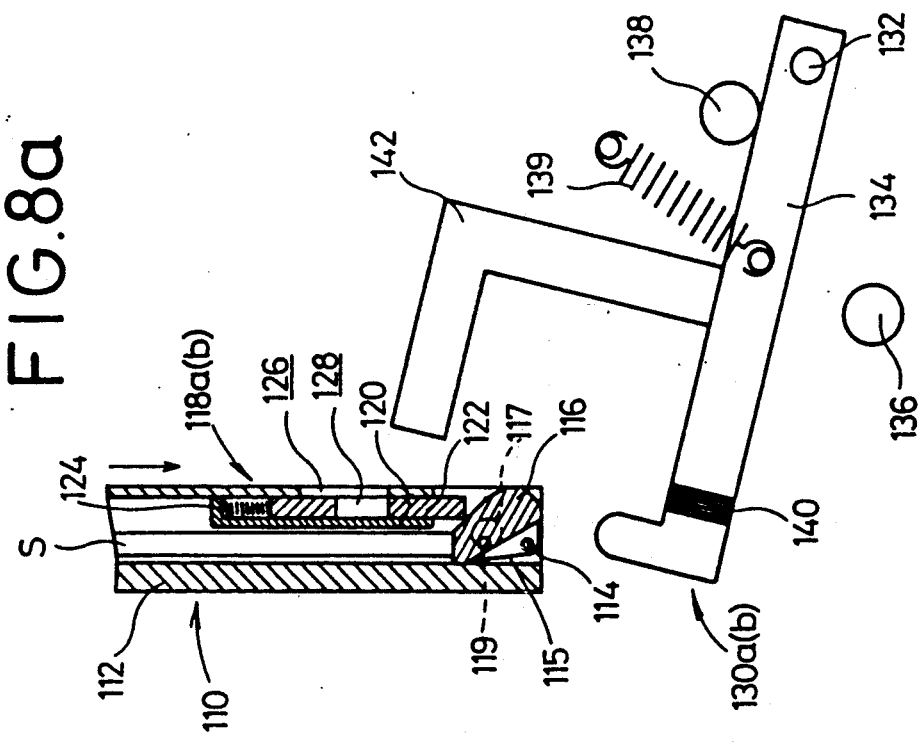

STORAGE TYPE PHOSPHOR SHEET HOLDING DEVICE

BACKGROUND OF THE INVENTION

1. Field of the Invention

The present invention relates to a device which is attached to a portable exposure apparatus for recording radiation image information on a storage type phosphor sheet and used to accommodate therein the storage type phosphor sheet which has already been subjected to exposure.

2. Description of the Related Art

When a certain phosphor is exposed to a radiation such as X-rays, $\alpha$-rays, $\beta$-rays, $\gamma$-rays, ultraviolet rays, or cathode rays, the phosphor stores a part of the energy of the radiation. It is well known that when the phosphor exposed to the radiation is subsequently exposed to stimulating rays such as visible light, the phosphor emits accelerated light in proportion to the stored energy of the radiation. The phosphor exhibiting such a property is referred to as a "storage type phosphor".

There has been proposed by the present applicant a radiation image information recording and reproducing system for temporarily storing information about the radiation-transmitted image of an object such as a human body in a sheet having a layer of storage type phosphor by making use of such a storage type phosphor as referred to above, scanning the storage type phosphor sheet with stimulating rays such as a laser beam so that the storage type phosphor sheet emits accelerated light, and photoelectrically detecting the emitted light to produce an image information signal that is electrically processed for reproducing the radiation-transmitted image of the object as a visible image on a recording medium such as a photographic photosensitive material or on a display such as a CRT, etc. (U.S. Pat. Nos. 4,258,264, 4,276,473, 4,315,318 and 4,387,428 for example).

In the radiation image information recording and reproducing system, it is sometimes necessary to make an exposure apparatus for photoelectrically recording image information on a storage type phosphor sheet, small in size and easy to carry so as to allow for the exposure apparatus to a sickroom or the like.

However, the conventional exposure apparatus has the drawback that since only the radiation source is moved to the sickroom or the like, a plurality of cassettes with storage type phosphor sheets being accommodated therein are necessary to carry upon exposure separately from the exposure apparatus, thereby causing inconvenience.

SUMMARY OF THE INVENTION

It is a principal object of the present invention to provide a storage type phosphor sheet holding device attached to a portable exposure apparatus and capable of withdrawing a storage type phosphor sheet from a cassette and accommodating the same therein only by a mechanical arrangement, thereby reducing the device to a small size and allowing convenient movement of the exposure apparatus.

It is another object of the present invention to provide a storage type phosphor sheet holding device having a cassette charging unit to be charged with a cassette in which a storage type phosphor sheet with radiation image information being recorded thereon is accommodated. A port for discharging the storage type phosphor sheet therefrom is defined vertically downwards, and a plurality of cover opening mechanisms each provided adjacent to a vertically-extending lower end of the cassette charging unit so as to open the discharging port of the cassette, also provided. A sheet holding unit is provided side by side with the cassette charging unit so as to hold the storage type phosphor sheet therein. A sheet shifting mechanism is provided away from the sheet holding unit upon introduction of the cassette into the cassette charging unit and provided with cassette forced-moving means entered into the sheet holding unit so as to shift the storage type phosphor sheet to the sheet holding unit upon withdrawal of the cassette from the cassette charging unit.

It is a further object of the present invention to provide the device wherein the cassette forced-moving means has a first link shifted by the cassette with which the cassette charging unit is charged, a second link operable with the shifting action of the first link, and means each for returning the first and second links to the original position when the cassette is detached from the cassette charging unit.

It is a still further object of the present invention to provide the device wherein the second link includes a pair of link members both of which are shifted in cooperation with the shifting action of the first link so as to force the storage type phosphor sheet into the sheet holding unit.

It is a still further object of the present invention to provide the device wherein the pair of link members of second link face upper and lower ends, respectively, of the storage type phosphor sheet.

It is a still further object of the present invention to provide the device wherein the returning means each comprise a coil spring brought into engagement with a rotating shaft of the second link to turn the second link for thereby returning the same to the original position.

It is a still further object of the present invention to provide the device wherein a tilted plate for guiding the storage type phosphor sheet to the sheet holding unit is provided.

It is a still further object of the present invention to provide the device wherein the plurality of cover opening mechanisms each have a cover-of-cassette opening pin provided to be shifted in the side direction of the cassette according to a shift in the direction in which the cassette is moved vertically downwards, the mechanisms each being used to open the cover member of the cassette by the cover-of-cassette opening pin.

It is a still further object of the present invention to provide the device wherein the plurality of cover opening mechanisms each have a pawl member brought into engagement with an engagement hole defined in the cassette so as to shift a holding plate according to the shift in the direction in which the cassette is moved vertically downwards, the mechanisms each being used to open the cover member of the cassette by the pawl member.

It is a still further object of the present invention to provide the device wherein the cassette forced-moving means includes at least one reduction transmission means for reducing the turning force of the first link to transmit the so-reduced turning force to the second link, thereby turning and hence shifting the second link.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 6(A) and 6(B) is a diagram for describing the operation of each of cover opening mechanisms employed in the storage type phosphor sheet holding device illustrated in FIG. 1;

FIG. 7 is a perspective view showing another embodiment of a cassette suitable for use in the storage type phosphor sheet holding device according to the present invention; and FIG. 8 is a diagram showing cover opening mechanisms associated with the cassette shown in FIG. 7 and for describing the operation of each of the cover opening mechanisms.

DETAILED DESCRIPTION OF THE PREFERRED EMBODIMENTS

Figure 1:
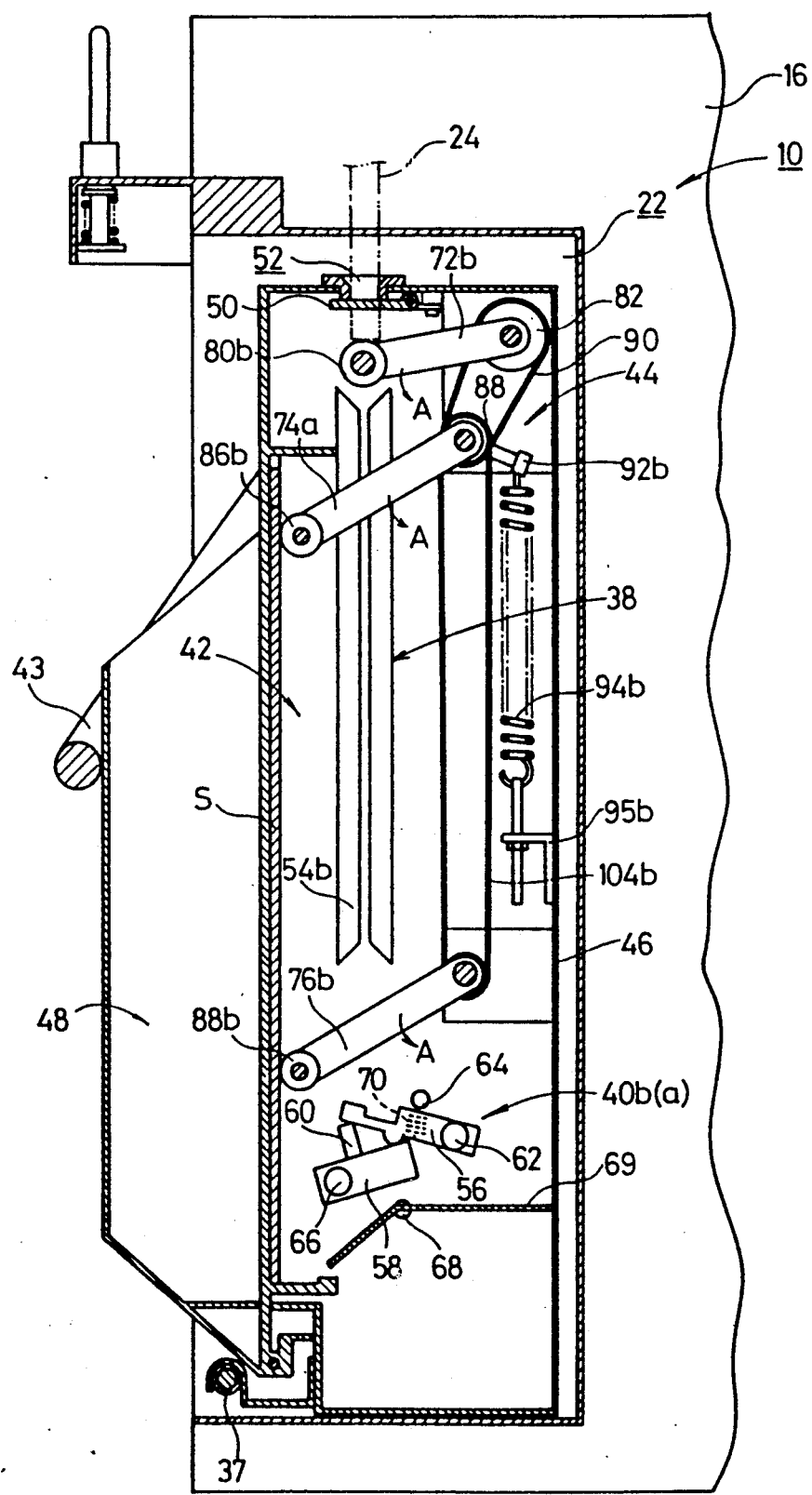
FIG. 1 is a cross-sectional view showing one embodiment of a storage type phosphor sheet holding device according to the present invention.
Figure 2:
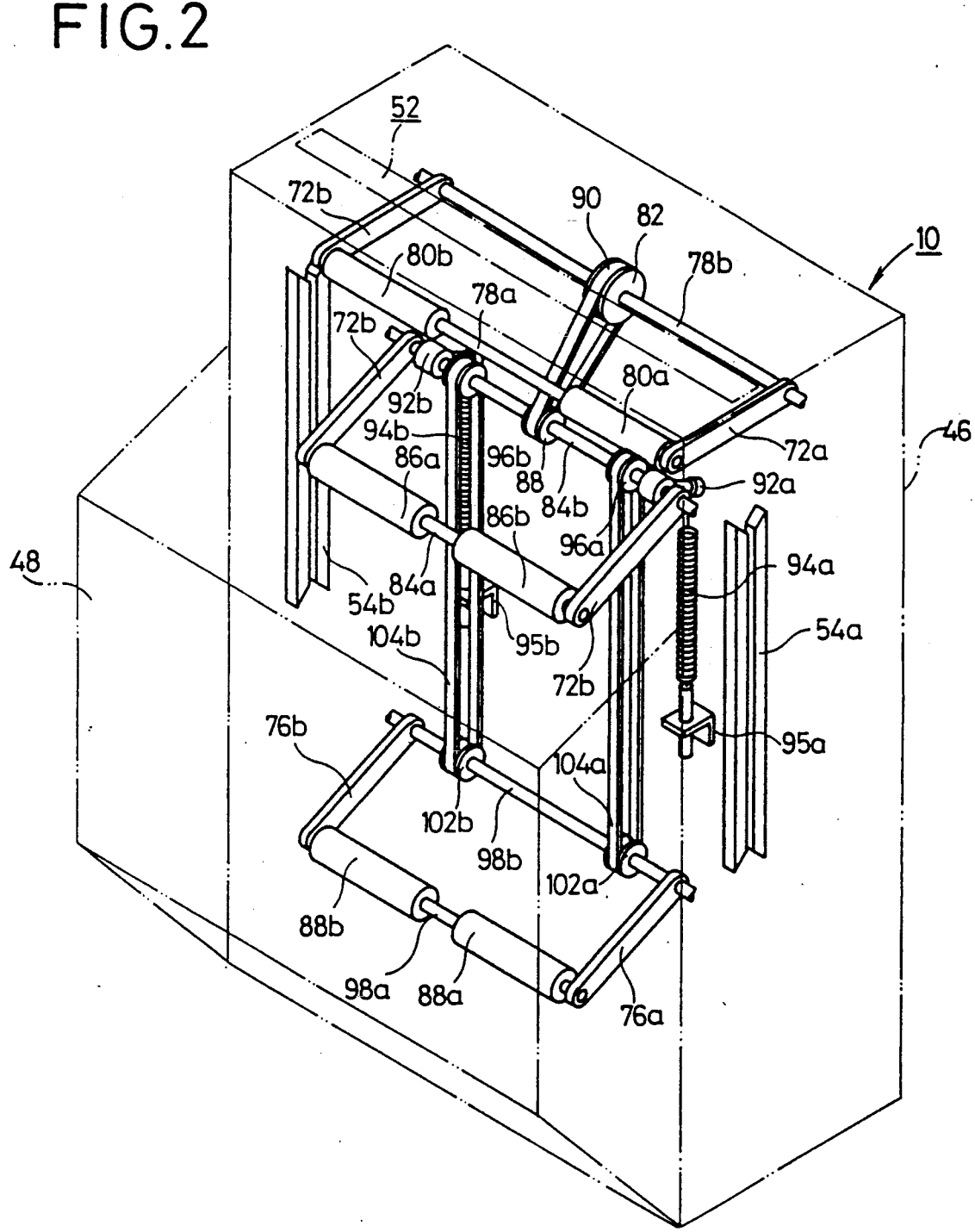
FIG. 2 is a perspective view of the storage type phosphor sheet holding device shown in FIG. 1.
Figure 3:
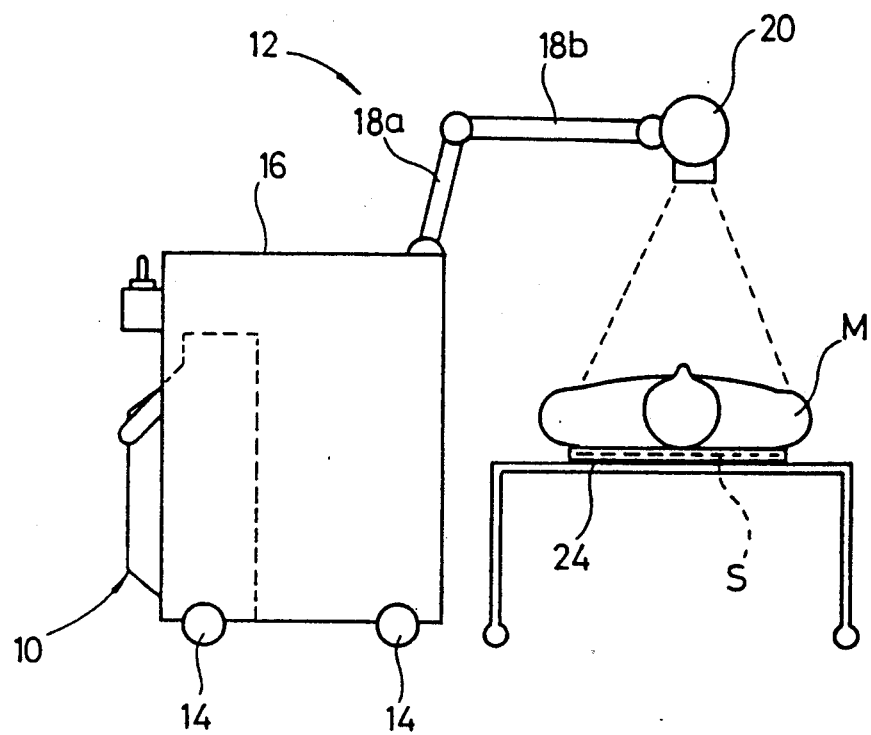
FIG. 3 is a diagram for describing an exposure apparatus to which the storage type phosphor sheet holding device illustrated in FIG. 1 is attached.

Referring to FIGS. 1 and 2, designated at numeral 10 is a storage type phosphor sheet holding device according to one embodiment of the present invention. The storage type phosphor sheet holding device is attached to an exposure apparatus 12 shown in FIG. 3.

The exposure apparatus 12 is constructed by mounting a radiation source 20 on a casing 16 movable by a pair of rollers 14 by way of arms 18a, 18b. The storage type phosphor sheet holding device 10 is so constructed that it can be held in a device holding unit 22 provided in the casing 16 (see FIG. 1). Incidentally, the x-ray irradiated by the radiation source 20 is applied to a storage type phosphor sheet S accommodated in the cassette 24 through an object M.

Figure 4:
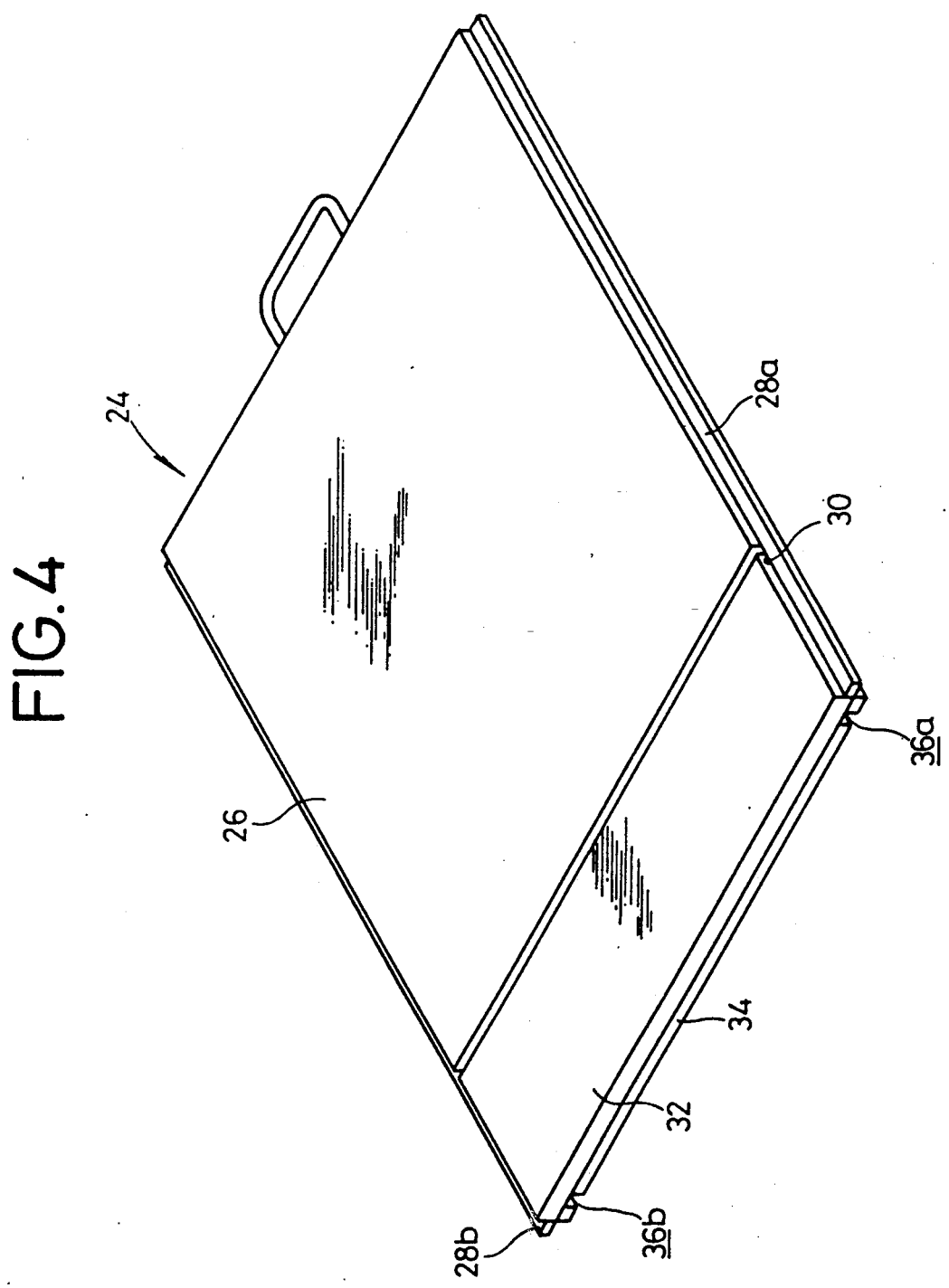
FIG. 4 is a perspective view of a cassette with which the storage type phosphor sheet holding device depicted in FIG. 1 is charged.

The cassette 24 is constructed as illustrated in FIG. 4. More specifically, the cassette 24 has a casing 26 for containing, i.e., accommodating the storage type phosphor sheet S therein. Convex portions 28a, 28b are provided along both sides of the casing 26. Incidentally, these convex portions 28a, 28b are selected in such a manner that those extending at right angles to the direction of length of the casing 26 are different in length from each other, i.e., those extending along the transverse direction of the casing 26 are different in width from each other. This is intended to charge the cassette 24 with the storage type phosphor sheet S upon exposure without making an error in the reverse and front sides of the storage type phosphor sheet S. The casing 26 has at its end a cover member 32 which is urged by a spring 27 in a direction in which it is open about a support shaft 30 (see FIGS. 4 and FIGS. 6a and 6b). A magnet member 34 for attracting the cover member 32 with a magnetic force so as to keep its opened state is provided on the side of the casing 26 disposed in an opposing relationship to the cover member 32. Incidentally, the magnetic member 34 has cut portions 36a, 36b defined in its both ends, which extend to the cover member 32.

Figure 5:
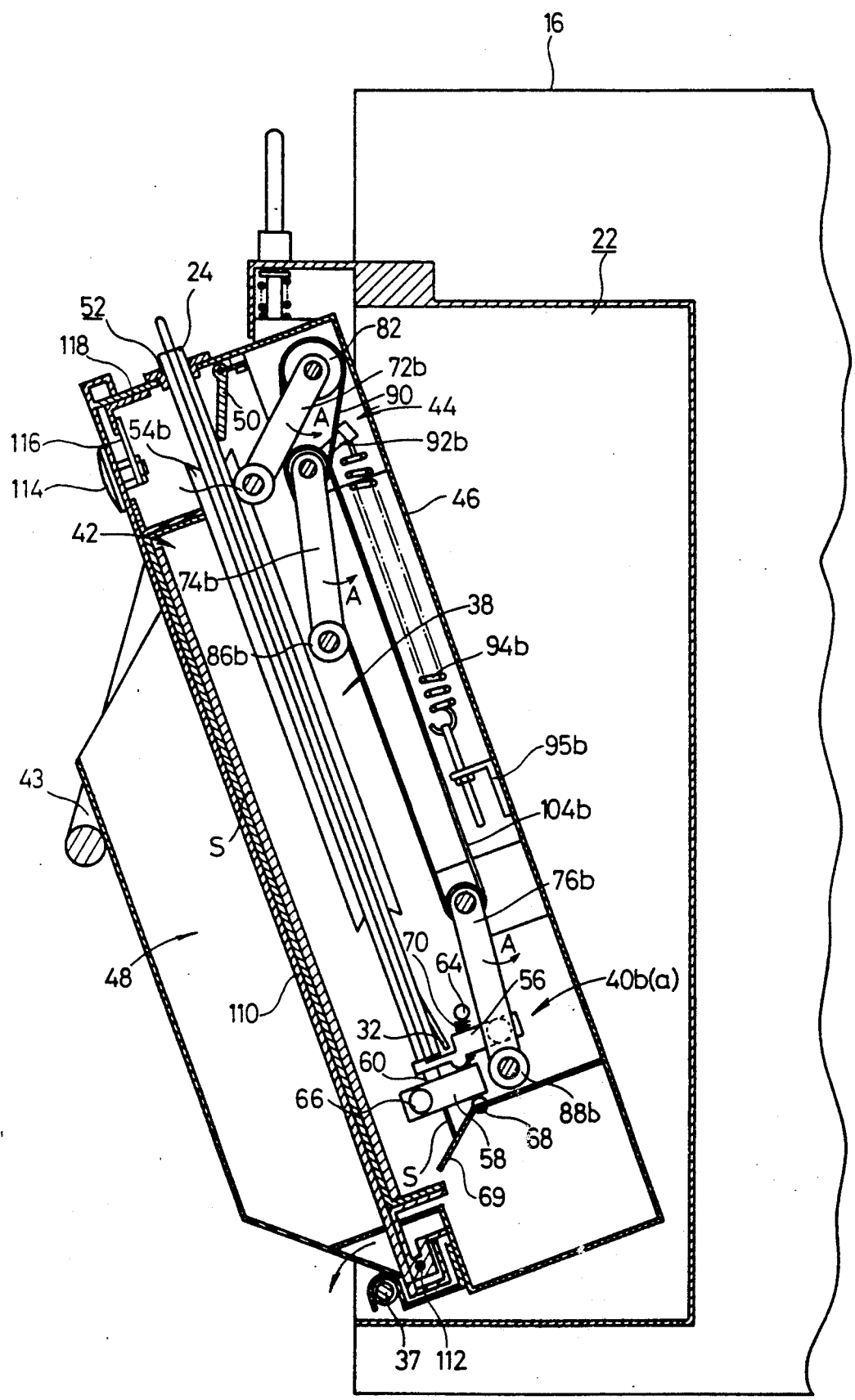
FIG. 5 is a diagram for describing the manner in which the storage type phosphor sheet holding device is charged with the cassette.

Referring again to FIGS. 1 and 2, the storage type phosphor sheet holding device 10 can be turned about a support shaft 37, and can hence be set to both states illustrated in FIGS. 1 and 5. Incidentally, the storage type phosphor sheet holding device 10 is constructed in such a way that its inside is kept in a light-shield state under the state shown in FIG. 1. The storage type phosphor sheet holding device 10 comprises a cassette charging unit 38 which is to be charged with the cassette 24 shown in FIG. 4, two pairs of cover opening mechanisms 40a, 40b provided below the storage type phosphor sheet holding device 10 and used to open the cover member 32 of the cassette 24, a sheet holding unit 42 for accommodating and holding therein an already-exposed storage type phosphor sheet S taken out of the cassette 24, a sheet shifting mechanism 44 for shifting the storage type phosphor sheet S to the sheet holding unit 42. Incidentally, a sheet holding unit 48 is provided even at the outside of a casing 46 of the storage type phosphor sheet holding device 10. A storage type phosphor sheet S, which is not yet photographically exposed, is accommodated in the sheet holding unit 48. As an alternative, the already-exposed storage type phosphor sheet S with which the cassette 24 is charged may be held together with the cassette 24.

The casing 46 has a cassette insertion hole 52 defined in its upper portion, which is normally closed by a cover member 50. The cassette charging unit 38 is charged with the cassette 24 through the cassette insertion hole 52. The cassette charging unit 38 has two pairs of guide members 54a, 54b which are spaced away from each other through a predetermined interval for holding the convex portions 28a, 28b formed on both sides of the cassette 24 between the guide members 54a and 54b. The guide members 54a, 54b each extend in a vertical direction in the state of FIG. 1. As is easily understood from FIG. 2, the guide members 54a, 54b each comprise a pair of rods which are spaced away from each other and have tapered faces directed upwardly and downwardly so as to be extendedly open. This is intended to facilitate the insertion of the cassette 24 into the cassette charging unit 38 and the withdrawal of the same therefrom. Incidentally, widths of slots defined by separating the respective rods of the guide members 54a, 54b from each other are set to be different from each other according to widths of the convex portions 28a, 28b formed on both sides of the casing 26. Thus, the prevention of the cassette 24 from being misloaded into the cassette charging unit 38 can be accomplished.

The cover opening mechanisms 40a, 40b are provided just below the cassette charging unit 38, and each have two support plates 56, 58 and a cover-of-cassette opening pin 60 provided upright on the support plate 58. The support plate 56 can be turned about a support shaft 62. The range, i.e., angle of turn of the support plate 56 with respect to the upper direction thereof is adjusted by a stopper pin 64. In addition, the support plate 58 can be turned about a support shaft 66, and the range, i.e., angle of rotation of the support plate 58 with respect to the upper direction thereof is controlled by the support plate 56. Incidentally, the range, i.e., angle of turn of the support plate 58 with respect to the lower direction thereof is controlled by a stopper pin 68. Incidentally, the support plate 58 is always urged toward the support plate 56 by a spring 70 coupled to the stopper pin 64.

A plate member 69 whose tip portion is slanted is provided adjacent to the stopper pin 68. When the storage type phosphor sheet S drops from the cassette 24 by its own weight, the plate member 69 serves to guide the storage type phosphor sheet S to the side of the sheet holding unit 42.

The sheet holding unit 42 is used to accommodate a plurality of already-exposed storage type phosphor sheets S therein, and is also provided at the inner side of the casing 46 arranged side by side with the cassette charging unit 38.

As shown in FIG. 2, the sheet shifting mechanism 44 has three sets of links 72a, 72b, 74a, 74b, and 76a, 76b.

A parallel support shaft 78a connects between one of both ends of the link 72a and one of both ends of the link 72b, whereas a parallel support shaft 78b connects between the other of both ends of the link 72a and the other of both ends of the link 72b. A pair of rollers 80a, 80b mounted on one of the support shafts 78a, 78b, i.e., the support shaft 78a are disposed between the cassette insertion hole 52 and an upper end portion of the cassette charging unit 38 in a state in which the cassette charging unit 38 is not charged with the cassette 24. In addition, a pulley 82 is supported by the other support shaft 78b at the intermediate portion thereof.

A parallel support shaft 84a connects between one of both ends of the link 74a and one of both ends of the link 74b, whereas a parallel support shaft 84b connects between the other of both ends of the link 74a and the other of both ends of the link 74b. A pair of rollers 86a, 86b mounted on one of the support shafts 84a, 84b, i.e., the support shaft 84a are disposed in an upper portion of the inside of the sheet holding unit 42 in a state in which the cassette charging unit 38 is not charged with the cassette 24. A pulley 88 is supported by the other support shaft 84b at the intermediate portion thereof. In this case, the diameter of the pulley 88 is set to be smaller than that of the pulley 82. In addition, a belt 90 is mounted taut between the pulleys 82 and 88. Incidentally, the pulleys 82, 88 and the belt 90 are constructed as a reduction/transmission means. One ends of coil springs 94a, 94b are coupled to the support shaft 84b by way of connecting members 92a, 92b. The other ends of the coil springs 94a, 94b extend downwards and are connected to the casing 46 through angle members 95a, 95b. Further, two pulleys 96a, 96b are mounted on the support shaft 84b.

Then, a parallel support shaft 98a connects between one of both ends of the link 76a and one of both ends of the link 76b, whereas a parallel support shaft 98b connects between the other of both ends of the link 76a and the other of both ends of the link 76b. A pair of rollers 88a, 88b disposed in a lower portion of the inside of the sheet holding unit 42 are mounted on one of the support shafts 98a, 98b, i.e., the support shaft 98a in a state in which the cassette charging unit 38 is charged with the cassette 24 in the same manner as the rollers 86a, 86b mounted on the support shaft 84a. On the other hand, two pulleys 102a, 102b are mounted on the other support shaft 98b. In this case, a belt 104a is mounted taut between the pulley 102a mounted on the support shaft 98b and the pulley 96a mounted on the support shaft 84b whereas a belt 104b is mounted taut between the pulley 102b mounted thereon and the pulley 96b mounted thereon. Incidentally, designated at numeral 110 in the drawing is a cover member, which is swingable about a shaft 112 in the casing 46. In addition, a knob 114 is rotatably provided at the tip portion of the cover member 110. The knob 114 serves to rotate a locking bar 116 so as to bring the tip portion of the locking bar 116 into engagement with an angle member 118, thereby bringing the cover member 110 into a locked state.

The storage type phosphor sheet holding device 10 according to the present embodiment and the exposure apparatus 12 to which the storage type phosphor sheet holding device 10 is attached are basically constructed as described above. A description will no be made of the operation of each of the storage type phosphor sheet holding device 10 and the exposure apparatus 12.

First of all, an object M is positioned on the cassette 24 in which an unexposed storage type phosphor sheet S is accommodated. Thereafter, an X-ray is applied to the object M by the radiation source 20 so as to photoelectrically record a transmitted-radiation image of the object M on the storage type phosphor sheet S.

Then, the cassette 24 in which an already-exposed storage type phosphor sheet S has been contained is loaded into the storage type phosphor sheet holding device 10 attached to the exposure apparatus 12. In this case, the storage type phosphor sheet holding device 10 is turned about the support shaft 37 by pulling a handle 43 toward an operator so as to be a state shown in FIG. 5. Then, the cassette 24 is inserted into the cassette insertion hole 52 defined in the upper portion of the casing 46 in a state in which the cover member 32 of the cassette 24 is kept downward. In this case, the cassette 24 forces the cover member 50 open so as to be inserted into the casing 46, thereby charging the cassette charging unit 38 with the cassette 24. In the cassette charging unit 38, the convex portions 28a, 28b formed on both sides of the casing 26 of the cassette 24 are held by the guide members 54a, 54b set in pairs, respectively, so that the cassette 24 is held by the cassette charging unit 38.

The sheet shifting mechanism 44 in the storage type phosphor sheet holding device 10 is operated in the following manner upon insertion of the cassette 24 into the cassette charging unit 38. More specifically, when the lower end of the cassette 24 is inserted into the cassette insertion hole 52, the lower end thereof presses against the rollers 80a, 80b to thereby turn the links 72a, 72b in the direction indicated by the arrow A (see FIG. 1). In this case, the pulley 88 mounted on the support shaft 84b of each of the links 74a, 74b is rotated by way of the pulley 82 and the belt 90 mounted on the support shaft 78b of each of the links 72a, 72b, so that the links 74a, 74b are turned in the direction indicated by the arrow A. In addition, the support shaft 98b is rotated by way of the pulleys 96a, 96b, the belts 104a, 104b and the pulleys 102a, 102b all of which are mounted on the support shaft 84b, so that the links 76a, 76b are turned in the direction indicated by the arrow A (see FIG. 5). Incidentally, since the diameter of the pulley 88 is set smaller than that of the pulley 82, the links 74a, 74b and 76a, 76b are turned in the direction indicated by the arrow A at a speed faster than that of the links 72a, 72b. Therefore, each of the rollers 86a, 86b and 88a, 88b is placed in a position spaced away from the cassette 24.

On the other hand, when the lower end of the cassette 24 reaches the cover opening mechanisms 40 provided within the casing 46, the cover member 32 is opened. More specifically, as shown in FIG. 6a, the lower end of the cassette 24 first serves to turn the support plate 56 in the direction indicated by the arrow A, thereby turning the support plate 58 in the direction indicated by the arrow B. When the support plate 58 is turned a predetermined amount, the cover-of-cassette opening pin 60 provided upright on the side of the upper face of the support plate 58 is allowed to enter through cut-away portions 36a, 36b defined in the tip portion of the cassette 24, thereby pressing the cover member 32. When the cover member 32 is spaced by a predetermined distance from the magnet member 34 by causing the cover-of-cassette opening pin 60 to press against the cover member 32, the property of attracting the cover member 32 is reduced. Thus, the cover member 32 is turned in the direction indicated by the arrow C by the resilient force of an unillustrated spring. As a result, the storage type phosphor sheet S, which has been accommodated in the cassette 24, drops by its own weight.

Then, the cassette 24 is withdrawn from the storage type phosphor sheet holding device 10. In this case, the storage type phosphor sheet S is left within the casing 46 and hence only the cassette 24 is taken out to the outside. On the other hand, since the cassette 24 is free from being loaded into the cassette charging unit 38, each of the links 72a, 72b, 74a, 74b and 76a, 76b is turned in the direction opposite to the direction indicated by the arrow A by the resilient force of each of the springs 94a, 94b so as to return to the original position. At this time, the storage type phosphor sheet S, which has been left within the cassette charging unit 38, is pressed and hence moved by the rollers 86a, 86b and 88a, 88b, so that it is accommodated in the sheet holding unit 42 (see FIG. 1).

An unexposed storage type phosphor sheet S, which has been prepared in advance in the sheet holding unit 48, is loaded into the cassette 24 taken out of the storage type phosphor sheet holding device 10 and free from the storage type phosphor sheet S so as to be subjected to a photographic recording again. By repeatedly performing the above-described work, a plurality of storage type phosphor sheets S are accommodated in the sheet holding unit 42 of the storage type phosphor sheet holding device 10.

The storage type phosphor sheets S superposed on each other as needed can be withdrawn from the sheet holding unit 42 by rotating the knob 114 to detach the locking bar 116 from the angle member 118 and then turning the cover member 110 about the shaft 112 so as to be opened.

FIGS. 7 and 8 each show another embodiment of a cassette suitable for use in the storage type phosphor sheet holding device according to the present invention, and of cover opening mechanisms associated with the cassette.

Referring to FIG. 7, a cassette 110 has a cover member 116 supported by a support shaft 114 at one end of a casing 112 and urged by spring members 115 in the direction in which the cover member 116 is opened. The cover member 116 is activated in such a manner that a port used for the discharge of the storage type phosphor sheet S is kept in a blocked state by locking means 118a, 118b. Incidentally, as shown in FIG. 8, the cover member 116 has a spring pin 119 fitted in a circular hole 117 which is defined in each of both sides of the casing 112. When the cover member 116 is turned about the support shaft 114, the spring pin 119 is brought into contact with the inner peripheral wall of the circular hole 117 to thereby control the region, i.e., angle of turn of the cover member 116 (see FIGS. 8a and 8b). Each of the locking means 118a, 118b has a locking lever 122 held within the casing 112 by a holding plate 120. Each locking level 122 is pressed and urged by a coil spring 124 in a direction in which it reaches the cover member 116. Each locking level 122 has an engagement hole 128 facing a hole 126 defined in the casing 112.

On the other hand, cover opening mechanisms 130a, 130b associated with the cassette 110 are provided within the storage type phosphor sheet holding device 10. Each of the cover opening mechanisms 130a, 130b has a support plate 134 turnable about a support shaft 132. In addition, stopper pins 136, 138 for controlling the region, i.e., angle of turn of the support plate 134 are provided above and below the support plate 134. Incidentally, the support plate 134 of each of the cover opening mechanisms 130a, 130b is always rendered tense on the side of the stopper pin 138 by a spring 139. Each of elastic members 140 comprised of rubber or coil springs, for example, is provided in the support plate 134 at a position where it is spaced away from the support shaft 132. Thus, each of the elastic members 140 permits an up-and-down movement of the tip portion of the support plate 134. Further, a pawl member 142 in the form of an inverted L letter is provided on the upper portion of the support plate 134 of each of the cover opening mechanism 130a, 130b.

When the storage type phosphor sheet holding device 10 is charged with the cassette 110, the support plates 134 of the cover opening mechanisms 130a, 130b are first forced down by the lower end of the cassette 110. When the support plate 134 of each of the cover opening mechanisms 130a, 130b is turned a predetermined amount at this time, the tip portion of each pawl member 142 is brought into engagement with the engagement hole 128 defined in the locking lever 122 of each of the locking means 118a, 118b through the hole 126 defined in the cassette 110. Then, when the cassette 110 is further forced downwards, the support plate 134 of each of the cover opening mechanism 130a, 130b is bent by the elastic members 140, and each pawl member 142 brought into engagement with the engagement hole 128 serves to force up the locking lever 122 of each of the locking means 118a, 118b. At this time, the cover member 116 is turned about the support shaft 114 by the spring members 115. As a result, the inside of the cassette 110 communicates with the outside as seen from the cassette 110, so that the storage type phosphor sheet S falls into the outside thereof.

The storage type phosphor sheet S taken out in the way is accommodated in the sheet holding unit within the storage type phosphor sheet holding device 10 in the same manner as described above.

Incidentally, the sheet holding unit 42 in which the storage type phosphor sheet S is contained can be detached from the casing 46. Thus, the sheet holding unit 42 can be used for reading of images from the storage type phosphor sheet S by detaching the sheet holding unit 42 from the casing 46 and charging an unillustrated reading device with the same.

According to the storage type phosphor sheet holding device of the present invention, as has been described above, the storage type phosphor sheet accommodated in the cassette can be loaded into the sheet holding unit by driving the links under the action at the time of insertion of the cassette into the cassette charging unit and withdrawal of the same therefrom. In this case, since the storage type phosphor sheet can be accommodated in the sheet holding unit only by the mechanical operation, the device can also be rendered small-sized with ease.

Having now fully described the invention, it will be apparent to those skilled in the art that many changes and modifications can be made without departing from the spirit or scope of the invention as set forth herein.

What is claimed is:

1. A storage type phosphor sheet holding device comprising:
    a cassette charging unit adapted to accommodate a cassette in which a storage type phosphor sheet with radiation image information being recorded thereon is accommodated, wherein said cassette has a port, for discharging said storage type phosphor sheet therefrom, defined vertically downwards thereon;
    a plurality of cover opening mechanisms each provided adjacent to a vertically-extending lower end of said cassette charging unit so as to open said discharging port of said cassette;
    a sheet holding unit provided proximate with said cassette charging unit adapted to hold said storage type phosphor sheet therein; and
    a sheet shifting mechanism operatively engaged with said cassette when said cassette is accommodated in said cassette charging unit, said shifting mechanism assuming a first position when said cassette is accommodated in said cassette charging unit, and said sheet shifting mechanism assuming a second position when said cassette is not accommodated in said cassette charging unit so as to shift said storage type phosphor sheet that has been discharged from said cassette to said sheet holding unit in response to withdrawal of said cassette from said cassette charging unit.

2. The device as claimed in claim 1, wherein said sheet shifting mechanism comprises:
    a first link moved by said cassette with which said cassette charging unit is charged, a second link operatively engaged with said first link, and means for returning said first and second links to an original position, corresponding to said second position, when said cassette is detached from said cassette charging unit.

3. The device as claimed in claim 2, wherein said second link includes a pair of link members both of which are moved in cooperation with movement of said first link so as to move said storage type phosphor sheet into said sheet holding unit.

4. The deice as claimed in claim 3, wherein said pair of link members of said second link engage with upper and lower ends, respectively, of said storage type phosphor sheet.

5. The device as claimed in claim 2, wherein said returning means comprises:
    a spring brought into engagement with a rotating shaft of said second link so as to turn said second link and return said second link to said original position.

6. The device as claimed in claim 1, wherein a tilted plate for guiding said storage type phosphor sheet to said sheet holding unit is provided.

7. The device as claimed in claim 1, wherein said plurality of cover opening mechanisms each have a cover opening pin provided to be shifted in the side direction of said cassette when said cassette is moved vertically downwards into said cassette changing unit, said opening mechanisms each being used to open the cover member of said cassette by said cover opening pin.

8. The device claim 1, wherein said plurality of cover opening mechanisms each have a pawl member brought into engagement with an engagement hole defined in said cassette so as to move a holding plate when said cassette is moved vertically downwards, said opening mechanisms each being used to the said cover member of said cassette by said pawl member.

9. The device as claimed in claim 2, wherein said sheet shifting mechanism includes at least one reduction transmission means for reducing the turning force of said first link and for transmitting the reduced turning force to said second link, thereby turning and hence moving said second link.

* * * * *

UNITED STATES PATENT AND TRADEMARK OFFICE
CERTIFICATE OF CORRECTION

PATENT NO. :    5,138,160
DATED      :    August 11, 1992
INVENTOR(S) :   Kunimasa SHIMIZU et al.

It is certified that error appears in the above-identified patent and that said Letters Patent is hereby corrected as shown below:

On the title page, item [73],
The assignees should be listed as:

Toritsu Kogyo Co., Ltd. and Fuji Photo Film Co., Ltd.

Signed and Sealed this

Nineteenth Day of April, 1994

Attest:

BRUCE LEHMAN

Attesting Officer    Commissioner of Patents and Trademarks